US008266103B1

(12) United States Patent
Pachipala et al.

(10) Patent No.: US 8,266,103 B1
(45) Date of Patent: Sep. 11, 2012

(54) SYNCHRONIZING RESOURCE TYPE AND PROPERTY STRUCTURES

(75) Inventors: Kranthi K Pachipala, Banglore (IN); Srikanthan Raghunathan, Bangalore (IN); Arati Pradhan, Bangalore (IN); John Thomas, Bangalore (IN); Michael Walther, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 151 days.

(21) Appl. No.: 11/644,076

(22) Filed: Dec. 21, 2006

(51) Int. Cl.
*G06F 17/30* (2006.01)
(52) U.S. Cl. .................................................. 707/617
(58) Field of Classification Search .................. 707/100, 707/617; 705/1
See application file for complete search history.

(56) References Cited

U.S. PATENT DOCUMENTS

| 2002/0147748 | A1* | 10/2002 | Huang et al. ................ 707/517 |
| 2005/0021348 | A1* | 1/2005 | Chan et al. ....................... 705/1 |
| 2006/0271843 | A1* | 11/2006 | Yarde et al. .................... 715/513 |
| 2007/0073671 | A1* | 3/2007 | McVeigh et al. ................. 707/4 |
| 2007/0180447 | A1* | 8/2007 | Mazzaferri et al. ............... 718/1 |

OTHER PUBLICATIONS

Markus Strehle, Java and .NET Code Samples for SAP Logon Ticket Verification, Feb. 24, 2005, SAP Developer Network, pp. 2-3 (Certificate Parser).*
Aleksandra Barilko, SDN and BPX Glossary, Mar. 7, 2007, SAP community Network,—https://wiki.sdn.sap.com/wiki/display/HOME/C, p. 2—"Certificate Parser".*

* cited by examiner

*Primary Examiner* — James Trujillo
*Assistant Examiner* — Amresh Singh
(74) *Attorney, Agent, or Firm* — Van Pelt, Yi & James LLP

(57) ABSTRACT

Extracting and synchronizing an Enterprise Portal application resource types and properties of business objects located in repository is disclosed. The repository is queried without human intervention to determine business object type information and for each business object type its associated properties. A representation of the business object types and associated properties in a format that facilitates synchronization with the enterprise portal application is generated.

24 Claims, 24 Drawing Sheets

```
<?xml version="1.0"?>
<!DOCTYPE login [
<!ELEMENT login (credentials)+>
<!ELEMENT credentials (#PCDATA)>
<!ATTLIST credentials
   docbase CDATA ""
   username CDATA ""
password CDATA ""
domain CDATA #IMPLIED>
]>

<!-- Please follow the above DTD for things to work -->

<login>
<!-- For easy of use copy the line below started with "credential" tag repeatedly as per the no of docbases-->
<!-- change the values for attributes according to your docbases.  -->
<credentials docbase="docbasename" username="userid" password="password" domain="domain"/>
</login>
```

Fig. 4

```java
    import org.xml.sax.helpers.DefaultHandler;
    ...//other imports..
    public class DCTMDocbaseInfoParser extends DefaultHandler {
ArrayList docbaseInfo = new ArrayList();

public void startDocument() throws SAXException {
}
 public void endDocument() throws SAXException {
        }
 public void startElement(String namespaceURI, String sName, // simple name
         String qName, // qualified name
         Attributes attrs) throws SAXException {

String eName = sName; // element name
             String docbaseName = "";
             String userName = "";
             String password = "";
             String domain = "";
         if ("".equals(eName)) {
             eName = qName;       } if (attrs != null && attrs.getLength() > 0) {
             for (int i = 0; i < attrs.getLength(); i++) {
               String aName = attrs.getLocalName(i); // Attr name if ("".equals(aName)) {
                     aName = attrs.getQName(i);
                 }
                         if("docbase".equals(aName))
                         docbaseName = attrs.getValue(i);
                         else if("username".equals(aName))
                         userName = attrs.getValue(i);
                         else if("password".equals(aName))
                         password = attrs.getValue(i);
                         else if("domain".equals(aName))
                         domain = attrs.getValue(i);

}
                DCTMDocbaseInfo info = new
DCTMDocbaseInfo(docbaseName,userName,password,domain);
docbaseInfo.add(info);

```
public ArrayList parseDocbaseInfo(DCTMDocbaseInfoParser handler)
    {

SAXParserFactory factory = SAXParserFactory.newInstance();
  factory.setValidating(true);
    try {
                        // Parse the input
        SAXParser saxParser = factory.newSAXParser();
      saxParser.parse(new File("./credentials.xml"), handler);
                } catch (SAXParseException spe) { //invalid xml document}

....
    return docbaseInfo;
    }
```

Fig. 6 Continued

```
            DCTMDocbaseInfoParser handler = new DCTMDocbaseInfoParser();
            ArrayList docbaseInfoList = handler.parseDocbaseInfo(handler);
            int size = docbaseInfoList.size();
            for (int i = 0; i < size; i++) {
                DCTMDocbaseInfo docbaseInfo =
    Try{                    (DCTMDocbaseInfo) docbaseInfoList.get(i);
    connectToDocbase(docbaseInfo);
    } catch{}
    ......
}
```

Fig. 7

```
String query = "select type_name from dmi_dd_type_info";
IDfQuery query = new DfQuery ();
query.setDQL (query);
IDfCollection col = query.execute (session, DfQuery.DF_READ_QUERY);
// session can be obtained once we connect to the docbase sussessfully.
//Now collection "col" contains all the resource types in the repository. We can iterate through
the collection and create an XML Node for each type.

while (col.next)
{
......
// create the configuration XML file for this type.
//construct an XML Document tree structure using the DOM(Document Object Model) XML
parser according to the DTD of resource types in SAP EP Global Services.
//

Element root, item = null;

try {
         DocumentBuilderFactory dbf=DocumentBuilderFactory.newInstance();
         DocumentBuilder db = dbf.newDocumentBuilder();
      Document doc = db.newDocument();

} catch (FactoryConfigurationError e) {
            ...
//handle exception.
        } catch (ParserConfigurationException e) {
//handle exception.

......
        }
..

root = doc.createElement("Configurable");
                            root.setAttribute("configclass","ResourceTypes");

root.appendChild(doc.createTextNode("\n"));
    item = doc.createElement("property");
    item.setAttribute("name","id");
    item.setAttribute("value",col.getString(type_name));
  root.appendChild(item);
```

Fig. 9

```
item = doc.createElement("property");
    item.setAttribute("name","iscollection");
    item.setAttribute("value","false");
    root.appendChild(item);

//add other items
....................

// add the root to the document.
doc.appendChild(root);

writeXML(doc);

//this method recursively traverses the tree representation of the XML //Node and writes to actual XML file in the file system.

} //end while
```

Fig. 9 Continued

```
echo off
if "%ANT_HOME%" == "" goto noAntHome
if "%JAVA_HOME%" == "" goto noJAvaHome
if "%DFC_HOME%" == "" goto noDFCHome
if "%DFC_DATA%" == "" goto noDFCDAta echo Using ANT_HOME = %ANT_HOME%
echo Using JAVA_HOME = %JAVA_HOME%
echo Using DFC_HOME = %DFC_HOME%
echo Using DFC_DATA = %DFC_DATA% set Path=%ANT_HOME%\bin;%JAVA_HOME%\bin;%DFC_HOME%\dctm.jar;%DFC_HOME%\Shared;%DFC_DATA%\Config;%Path%;

jar -xvf com.documentum.ei.eprm.extractor.jar
echo Now Connecting to docbase to extract .. Please wait.
java -classpath
".;.\log4j.jar;%ANT_HOME%\bin;%JAVA_HOME%\bin;%DFC_HOME%\dctm.jar;%DFC_HOME%\Shared;%DFC_DATA%\Config;%classpath%"
com.documentum.ei.eprm.extractor.DCTMExtractor echo extracting is done
if exist ".\DCTMRM" goto do_ant
echo No configuration data found. skipping creation of configArchive and bundle par files.
goto done
:do_ant
echo creating configarchive file and bundle par.
ant
echo
echo finished extraction
goto done :noAntHome
echo please set ANT_HOME
pause
goto finish
```

Fig 11

```
:noJAvaHome
echo please set JAVA_HOME
pause
goto finish

:noDFCHome
echo please set DFC_HOME
pause
goto finish

:noDFCDAta
echo please set DFC_DATA
pause
goto finish

:done
ant clean

:finish
echo finished
```

Fig 11 Continued

```
# Environment Variable Prequisites
# JAVA_HOME      Must point at your Java Development Kit installation.
# ANT_HOME       Must point at ant installation directory.
# DOCUMENTUM_HOME   Must point to documentum installation directory.
if [ "$JAVA_HOME" = "" ] ; then
echo "please specify the JAVA_HOME environment varialbe."
exit
fi if [ "$ANT_HOME" = "" ] ; then
echo "please specify the ANT_HOME enviroment variable."
exit
fi if [ "$DOCUMENTUM_HOME" = "" ] ; then
echo "please specifythe DOCUMENTUM_HOME environment varialbe."
exit
fi
PATH=${PATH}:${ANT_HOME}/bin:${JAVA_HOME}/bin:
export PATH echo "Using JAVA_HOME = $JAVA_HOME."
echo "Using ANT_HOME = $ANT_HOME."
echo "Using DOCUMENTUM_HOME = $DOCUMENTUM_HOME."

LD_LIBRARY_PATH=$DOCUMENTUM_HOME/dfc
export LD_LIBRARY_PATH

CLASSPATH=$CLASSPATH:$DOCUMENTUM_HOME/dctm.jar:$DOCUMENTUM_HOME/dfc/dfc.jar:$DOCUMENTUM_HOME/dfc/dfcbase.jar:$DOCUMENTUM_HOME/config
export CLASSPATH
echo $CLASSPATH jar -xvf com.documentum.ei.eprm.extractor.jar
```

Fig. 12

```
echo "Now Connecting to docbase to extract .. Please wait."
java -classpath ".:./log4j.jar:$CLASSPATH"
com.documentum.ei.eprm.extractor.DCTMExtractor
echo "extracting is done"
if [ -e "./DCTMRM" ] ; then
echo "creating configarchive file and bunlde par."
ant
ant clean
echo "finished."
exit
else
echo "problem occured while running extractor"
ant clean
fi
```

```xml
<?xml version="1.0"?>
<!-- Start project and set basedir to project level -->

<project name="dmep_repmgr" default="build" basedir=".">
    <property name="app.name" value="dmep_repmgr" />
    <property name="build.home" value="${basedir}/DCTMRM/xmlFiles"/>
    <property name="build.home.priv" value="${build.home}/build"/>
    <property name="build.home.priv.config" value="${build.home.priv}/config"/>
    <property name="build.home.priv.config.install" value="${build.home}/temp"/>
    <property name="build.home.priv.config.install.data" value="${build.home.priv.config.install}/install/data"/>

<!-- Build the project                      -->
    <!-- Compiles,Creates jar,config archive files,javadoc for source  -->
    <!-- clean the temporay build directory
    -->
    <!--
    ==========================================================================
    -->

<target name="build" depends="mk_dir" description="Build the project component as par file">
            <!--Check the directory for source files -->
            <antcall target="create_configarchive"/>
            <antcall target="resource_bundle_par"/>
            <antcall target="clean_home"/>
            <antcall target="clean"/>
            </target>
    <target name="mk_dir" depends="clean_home" description="Create the temporary directories which will used for build">
        <!-- Make new directories -->
            <mkdir dir="${build.home.priv}"/>
                <!-- for Config Archive file-->
            <mkdir dir="${build.home.priv.config}"/>
            <mkdir dir="${build.home.priv.config.install}"/>
            <mkdir dir="${build.home.priv.config.install.data}"/>
    </target>
    <!-- Create the Config Archive file                      -->
    <!--==========================================================================-->
```

Fig. 17

```xml
<!-- Configarchive conatins contains all configuration file including metaconfig file. -->
<target name="create_configarchive" description="creates the .configarchive file">
    <copy todir="${build.home.priv.config.install.data}">
        <fileset dir="${build.home}/local/data">
            <include name="**/*"/>
        </fileset>
    </copy>
    <mkdir dir="${basedir}/configarchive"/>
    <!-- Create the jar file as .configarchive.metadata reading from
configarchive.properties file- need to add menifest file-->
    <jar jarfile="${basedir}/configarchive/extractor.prjconfig.configarchive" whenempty="skip">
        <manifest>
            <attribute name="CA-Creation-Time" value="${TSTAMP}"/>
            <attribute name="CA-Creation-Machine" value="PropertyExtractor"/>
            <attribute name="CA-Dependencies" value="bc.util.prjconfig, bc.sf.prjconfig, bc.sf.service.prjconfig, bc.rf.prjconfig"/>
            <attribute name="CA-Creation-User" value="Administrator"/>
            <attribute name="CA-Name" value="extractor.prjconfig"/>
            <attribute name="CA-Creation-Date" value="${DSTAMP}"/>
            <attribute name="CA-Version" value="1.0"/>
        </manifest>
        <fileset dir="${build.home.priv.config.install}"/>
    </jar>
    <delete dir="${build.home.priv.config.install}" quiet="true"/>
</target>
<target name="resource_bundle_par" depends="copy_for_par" description="resource_bundle_par ">
<!-- Create the jar file as .configarchive.metadata reading from configarchive.properties file-
need to add menifest file-->
    <mkdir dir="${basedir}/resourcebundle"/>
    <jar jarfile="${basedir}/resourcebundle/com.documentum.ei.eprm.ResourceBundleProject.par" whenempty="skip">
        <fileset dir="${build.home.priv}/temp"/>
    </jar>
</target>
```

Fig. 17 Continued

```xml
<target name="copy_for_par" description="copy src to create par">
    <mkdir dir="${build.home.priv}/temp/PORTAL-INF/lib"/>
    <copy todir="${build.home.priv}/temp/PORTAL-INF">
        <fileset dir="${basedir}">
            <include name="portalapp.xml"/>
        </fileset>
    </copy>
    <!-- Create the jar file as .configarchive.metadata reading from
configarchive.properties file- need to add menifest file-->
    <copy todir="${basedir}/Bundles/com">
        <fileset dir="${basedir}/com">
            <include name="documentum/ei/eprm/extractor/wrapper/*"/>
        </fileset>
    </copy>
    <jar jarfile="${build.home.priv}/temp/PORTAL-INF/lib/api.jar" whenempty="skip">
        <fileset dir="${basedir}/Bundles"/>
    </jar>
</target>
<!-- Clean the temp build directory -->
<!--=================================================-->
<target name="clean_home" description="Delete build and dist directories">
    <delete dir="${build.home.priv}" includeEmptyDirs="true" verbose="true"/>
</target>
<target name="clean" description="Delete build and dist directories">
    s<delete dir="${basedir}/Bundles" includeEmptyDirs="true" verbose="true"/>
    <delete dir="${basedir}/DCTMRM" includeEmptyDirs="true" verbose="true"/>
    <delete dir="${basedir}/com" includeEmptyDirs="true" verbose="true"/>
    <delete dir="${basedir}/dmcl" includeEmptyDirs="true" verbose="true"/>
    <delete dir="${basedir}/META-INF" includeEmptyDirs="true" verbose="true"/>
</target>
</project>
```

Fig. 17 Continued

```
    String query = "select type_name from dmi_dd_type_info";
    IDfQuery query = new DfQuery ();
    query.setDQL (query);
    IDfCollection col = query.execute (session, DfQuery.DF_READ_QUERY);
// session can be obtained once we connect to the docbase sussessfully.
//Now collection "col" contains all the resource types in the repository. We can iterate through
the collection and create an XML Node for each type.

while (col.next)
{
......
// create the configuration XML file for this type.
//construct an XML Document tree structure using the DOM(Document Object Model) XML
parser according to the DTD of resource types in SAP EP Global Services.
//
        Element root, item = null;

try {
         DocumentBuilderFactory dbf=DocumentBuilderFactory.newInstance();
         DocumentBuilder db = dbf.newDocumentBuilder();
      Document doc = db.newDocument();

} catch (FactoryConfigurationError e) {
            ...
//handle exception.
        } catch (ParserConfigurationException e) {
//handle exception.

```
root = doc.createElement("Configurable");
                    root.setAttribute("configclass","ResourceTypes");

root.appendChild(doc.createTextNode("\n"));
    item = doc.createElement("property");
    item.setAttribute("name","id");
    item.setAttribute("value",col.getString(type_name));
  root.appendChild(item);

item = doc.createElement("property");
  item.setAttribute("name","iscollection");
  item.setAttribute("value","false");
  root.appendChild(item);

//add other items
.....................

// add the root to the document.
doc.appendChild(root);

writeXML(doc);

//this method recursively traverses the tree representation of the XML //Node and writes to
actual XML file in the file system.

} //end while
```

Fig. 18 Continued

SYNCHRONIZING RESOURCE TYPE AND PROPERTY STRUCTURES

BACKGROUND OF THE INVENTION

The SAP Repository Framework is an extendable framework specified by SAP, which enables applications to access and manipulate objects that are stored in various information sources in a uniform, consistent manner. Examples of information sources, sometimes referred to herein as repositories, include a document or other content management system or a file system that stores unstructured data like text or graphics. Another example of a repository is a backend system like a database or an enterprise resource planning (ERP) system that contains structured data in the form of data records or business objects. A repository is connected to the repository framework through a Repository Manager. The Repository Manager converts the repository's internal representation of information into the uniform representation of the framework and vice versa. Applications benefit from the uniform representation because they do not have to deal with the specific behavior of different information sources. For example, a workflow application based on the framework can be extended to documents in other repositories simply by integrating the repositories in the framework. No special coding is required. Similarly, objects from information sources can benefit from the applications built on top of the framework. When a new repository is integrated in the framework, all the objects that are exposed as resources can use the applications and functions available for the framework.

In order to access the metadata, and not just the content, of the business objects stored in external repositories, the resource types and associated properties must be extracted for each and every different kind of business object present in the repositories.

In the SAP Enterprise Portal (SAP EP), to create the document types, one has to manually browse to System Administration→System Configuration→Knowledge Management→Content Management→Global Services→ Resource Types. Then, click on the "new" button and enter the required fields.

Similarly, to create a property one has to manually browse to System Administration→System Configuration→ Knowledge Management→Content Management→Global Services→Property Metadata→Properties. Then, click on the "new" button and enter the required fields.

In an Enterprise Portal, one may have to handle a large number of different types of business objects with large numbers of resource types and properties and each resource type and property has to be entered manually at present. This is a laborious, time consuming and difficult task as one has to manually create types and associated properties in the Global Services of the SAP EP or any other Repository Manager. Therefore, it would be desirable to eliminate the need for manual entry and synchronization of the resource types and associated properties of business objects in the Global Services of the SAP EP and to devise a solution for the automation of the synchronization and importing of types and properties of the business objects with the Global Services of the SAP EP.

BRIEF DESCRIPTION OF THE DRAWINGS

Various embodiments of the invention are disclosed in the following detailed description and the accompanying drawings.

FIG. 4 is sample of the credentials.xml file residing in the repositories.

FIG. 6 is a sample code for parsing credentials.xml file.

FIG. 7 is a sample code to retrieve credentials in a list.

FIG. 9 is a sample code for extraction of the resource types and properties information.

FIG. 11 is a sample code for a RunExtractor.bat file

FIG. 12 displays a sample code for a RunExtractor.sh file

FIG. 15 is a diagram of the screen in the currently known SAP EP that shows uploading of the com.documentum.ei.eprm.ResourceBundleProject.par file into the SAP EP.

FIG. 16 is a diagram of the screen in the currently known SAP EP that illustrates the creation of the resource type and properties after importing of the extractor.prjconfig.configarchive file (108) into SAP EP.

FIG. 17 shows sample code illustrating the creation of the extractor.prjconfig.configarchive file (108) and the com.documentum.ei.eprm.ResourceBundleProject.par file (109).

FIG. 18 illustrates the sample code of the successful connection to the repository, constructing an XML Document tree structure using an XML parser according to the DTD of resource types in SAP EP Global Services and writing to the actual XML file in the file system.

DETAILED DESCRIPTION

Figure 1:
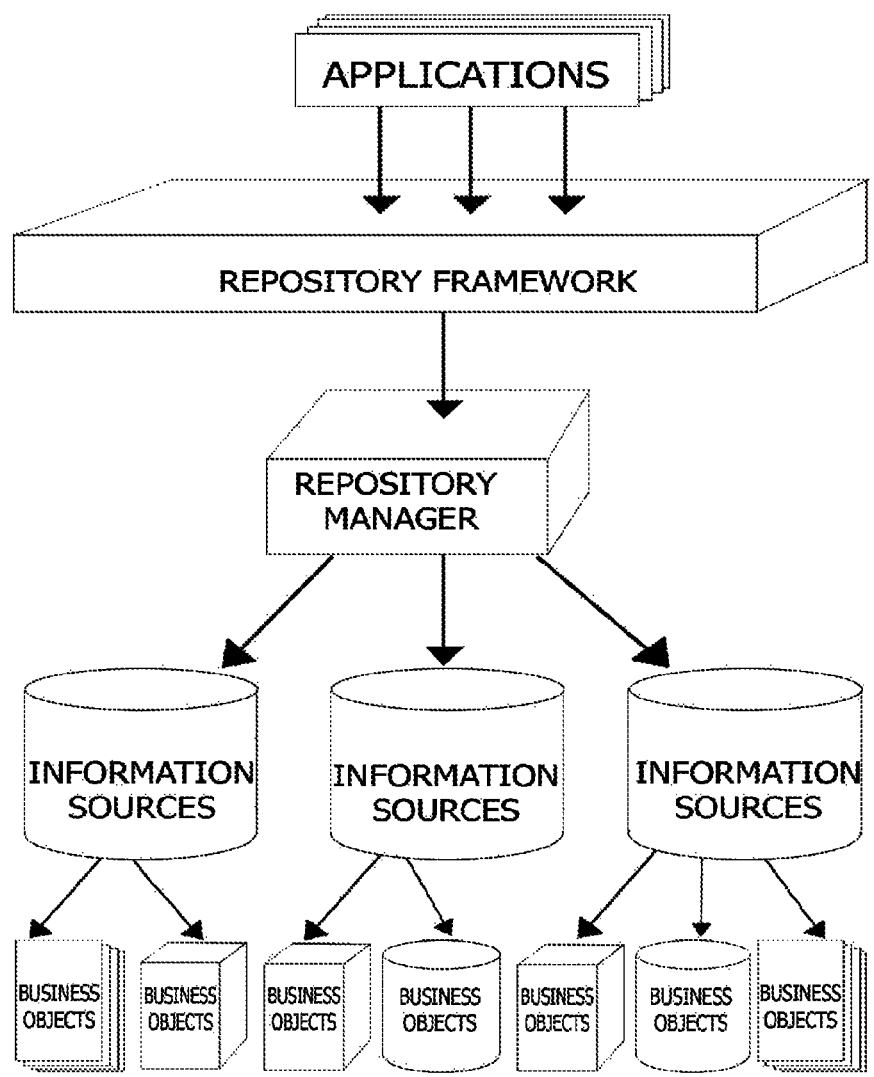
FIG. 1 is a conceptual diagram of the Repository Framework.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Extracting and synchronizing resource and property types of different kinds of business objects located in a content repository and accessed through Repository Managers of an Enterprise Portal is disclosed. In some embodiments, a Java program is run through a script configured with a file storing repository credential details to access and select business objects located in the repository. A file containing resource and property information of business objects to synchronize with the Global Services of the SAP EP is created.

Definitions of the various terms that are used in the description are given below in order to facilitate better understanding of the invention.

SAP EP—This is the SAP Enterprise Portal.

DTD—Document Type Definition is primarily used for the expression of a schema via a set of declarations that conform to a particular markup syntax and that describe a class, or type. In this case the DTD may also declare constructs that are not always required to establish document structure, but affect the interpretation of some documents.

DQL—Documentum Query Language similar to SQL and is the language used to query the EMC Documentum™, an enterprise content management platform available from EMC Corporation of Hopkinton, Mass.

JAR file—This is a ZIP Java Archive file used to store compiled Java classes and associated metadata for programs.

PAR file—PAR files are "Portal Archive Files" used by SAP Enterprise Portal to deploy applications associated with SAP EP.

A property structure displays properties of an object (folder, document, or link) in a fixed order. In SAP EP, a property structure can be displayed in the "Details" dialog box for a document or folder under "Settings/Properties" or using the link "Show Properties" while creating or editing a document or folder.

Figure 10:
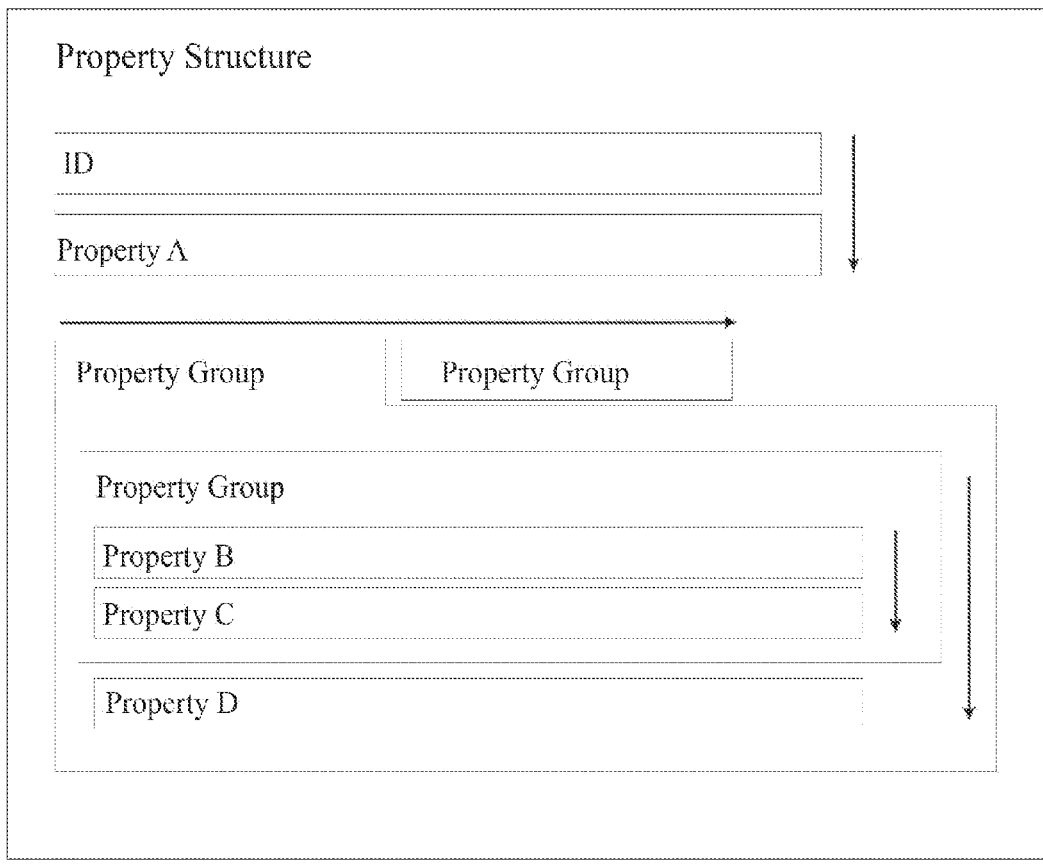
FIG. 10 is a diagram of the screen in the currently known SAP EP where property types for different business objects may be added.

FIG. 10 shows how the properties can be structured and grouped. A property structure contains properties and property groups. A property group may contain properties and other property groups. Properties and property groups are ordered in descending order by default. If the parameter Single Focus is activated, properties and property groups are displayed on tabs ordered from left to right.

Figures 2, 3:
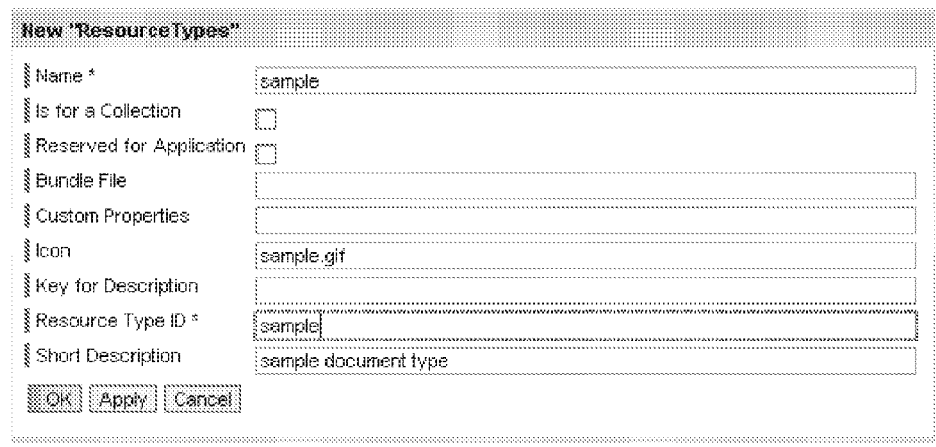
FIG. 2 is a diagram of a resource type as displayed in SAP EP Global Services.
FIG. 3 is a sample code of the resource type of FIG. 2.
Figure 5:
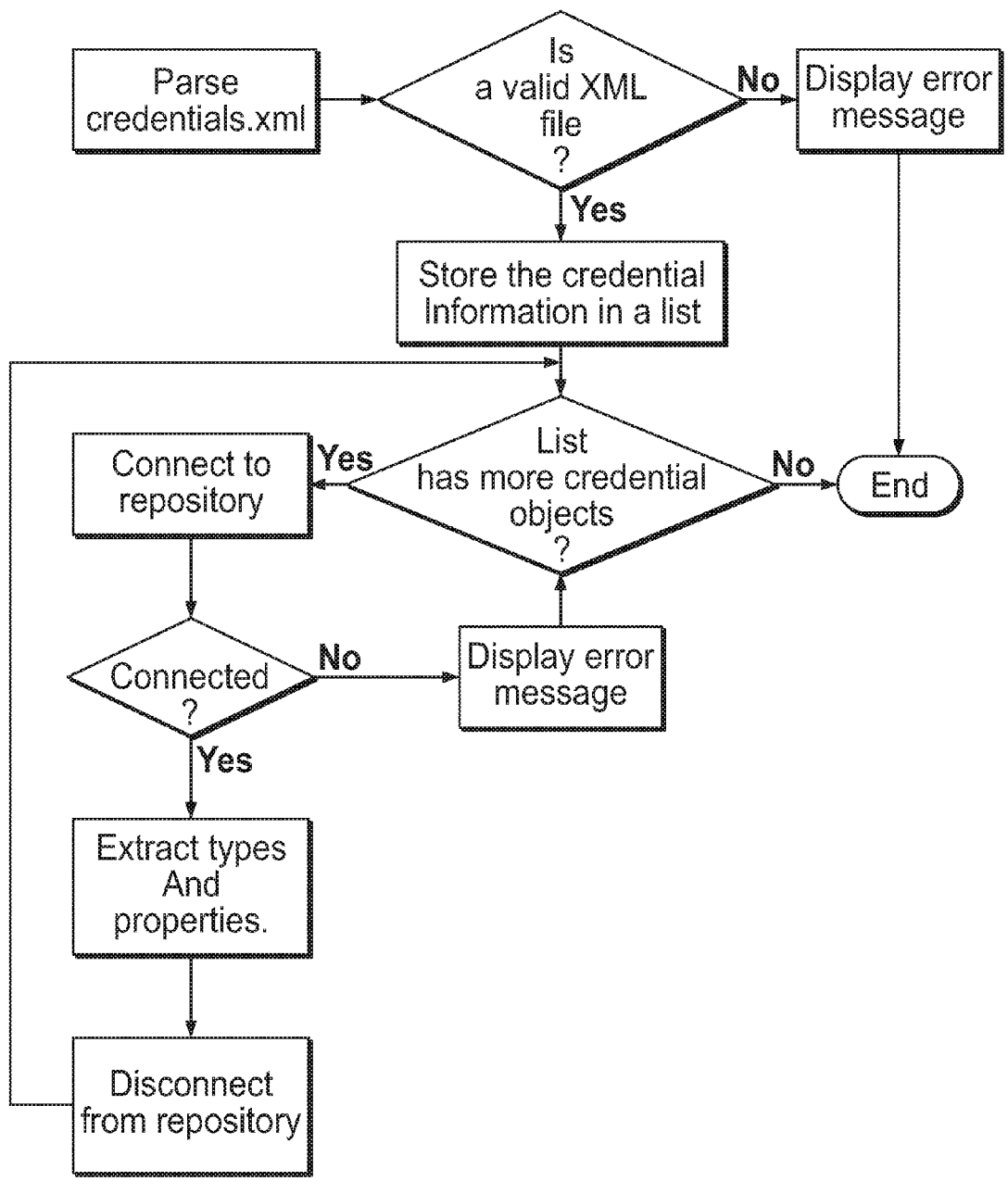
FIG. 5 is a flow diagram of an embodiment of the invention.

In SAP EP each resource type and property of an object is represented as an XML file. FIG. 2 is the representation of a resource type as it appears on the SAP EP screen and FIG. 3 is the XML file created corresponding to that resource type.

In SAP EP, one can specify properties and groups in the configuration of property structures that are created using the property metadata service. One can create various display modes and resource types for different property structures. Resource types are normally provided by applications. Therefore, the option of creating their own resource types is primarily directed at developers. One can then specify the property groups in the configuration of a property structure. The elements of a property group are displayed on the user interface in the order specified in the configuration.

Using the techniques disclosed herein, users do not need to assign hundreds of object types and properties manually. Let us assume that a particular repository has twenty different object types. Let us further assume that on average each object type contains twenty-five attributes/properties. Now if the SAP EP user wants to use this repository from SAP then they will encounter twenty different types of objects. They also encounter 500 (i.e., 20×25=500) different properties performing manually the method mentioned in the paragraph immediately above.

Using an automated process to read object type and property information from a repository is disclosed. Enterprise Portal users can access through the Enterprise Portal objects stored in a strongly-typed repository without having to assign types/properties manually for each kind of object present in the repository. In some embodiments, a one way automated synchronization from a strongly typed repository, in which resource types and properties are defined in a development-level process requiring careful design, to a loosely typed enterprise portal, in which it is relatively easy to define resource types and properties dynamically, is performed. In some embodiments, an automated process learns the relatively static (strongly typed) structure of objects in the repository by querying the repository for that information. The structural information learned from the repository is used to create dynamically corresponding types and/or properties in the enterprise portal, enabling objects stored in the repository to be accessed via the Enterprise Portal, through the Repository Manager. In some embodiments, which repository type information is replicated into the Enterprise Portal is configurable, e.g., by object type, by language/locale, and/or by selection of one or more attributes.

In some embodiments, credential information to access the business objects located in a repository is extracted from an XML file. The XML file is parsed to get the credential information which is used to access the business objects in the repository and extract the resource types and properties, which are written to as a set of XML files. Label information for displaying the resource types and properties in synchronicity with the Global Services of the SAP EP is created.

Figure 8:
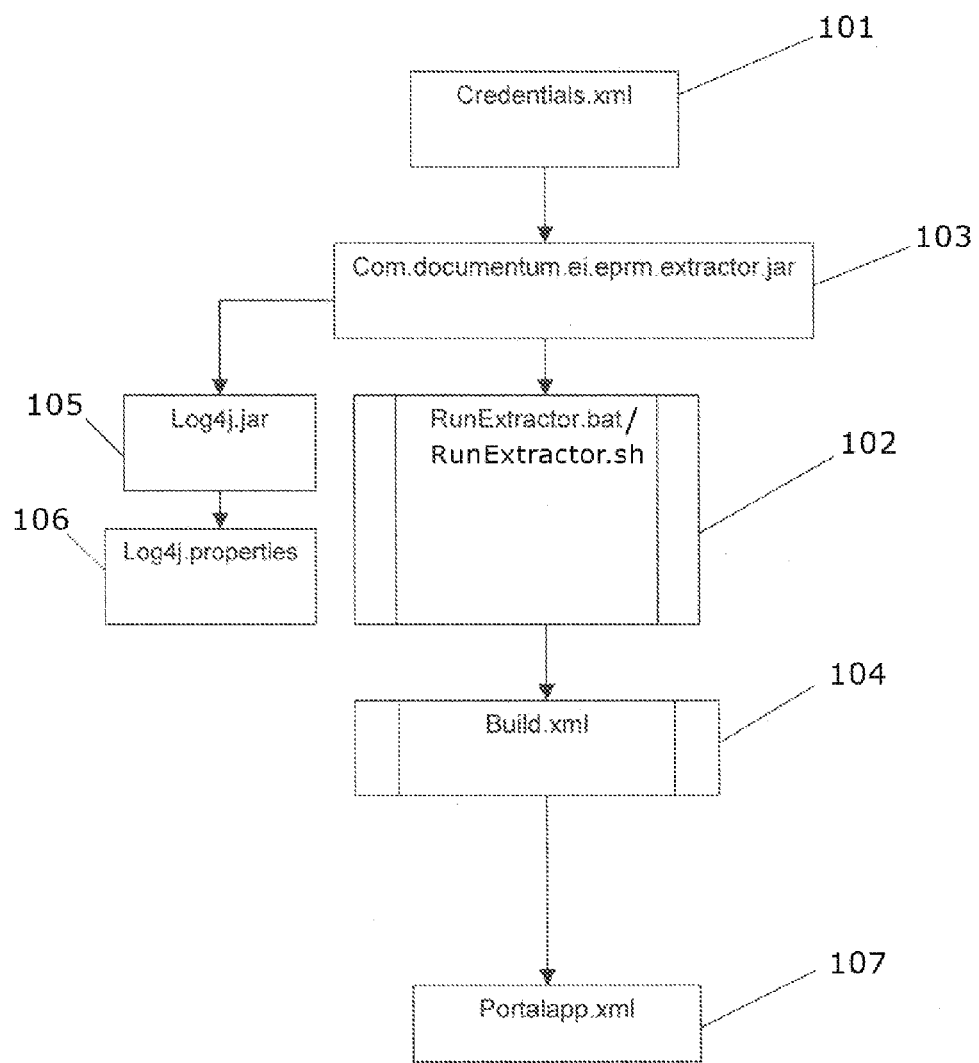
FIG. 8 is a Flow Diagram for the interaction between the Java files.

FIG. 8 shows an embodiment of a set of files used to initiate and perform the automated extraction of business object types and properties. In the example shown, the initiation, parsing and extraction occur on a Java platform and requires seven files to execute the entire process:

i. credentials.xml (101)—This file contains the credential details for the repositories;

ii. RunExtractor.bat or RunExtractor.sh (102)—These batch/shell script files run the Java program and build the script. FIG. 11 displays the sample code for a RunExtractor.bat file and FIG. 12 displays the sample code for a RunExtractor.sh file;

iii. com.documentum.ei.eprm.extractor.jar file (103)—This is a JAR file, i.e. a Java Archive file and contains the class files, which implement the extractor logic;

iv. build.xml file (104)—This file creates the .configarchive for XML files and .PAR for resource bundles in the required format;

v. log 4j.jar (105)—This is a jar file that writes a log;

vi. log 4j.properties (106)—This file contains the settings for the log 4j, for example, the log file name; and vii. portalapp.xml (107)—This is a XML file, which is needed to package the PAR files. This is mandated by SAP EP for creating correct PAR files.

The .configarchive file format was defined by SAP to facilitate transferring structural information (metadata) between SAP EP systems (development to quality assurance and/or quality assurance to production). As disclosed herein, the .configarchive file is used to synchronize SAP EP with a strongly-typed repository by extracting from the repository and uploading to SAP EP, using the .configarchive file, structural information (e.g., object type and property information) of business objects stored in the repository.

In some embodiments, the process implemented by the files described above can be scheduled to run like a batch job as a command line either from a Windows or a Unix environment and can be run to completion by eliminating any human interaction.

In some embodiments, in a Windows or a Unix environment proper versions of ancillary Java programs such as ANT, JDK and DFC must be installed on the machine. In some embodiments, if the system environment variables are not properly set, a prompt is given to the user to set those variables.

In some embodiments, the Java 2 platform, version 1.4.2 is used. In the example illustrated in the FIGS. 2-9, the repository comprises the EMC Documentum 5.2.5 Service Pack 4 Enterprise Content Management software/platform. In some embodiments, the Apache Ant 1.6.2 is used.

In some embodiments, a download of the credentials.xml file (101), RunExtractor.bat or RunExtractor.sh file (102), com.documentum.ei.eprm.extractor.jar file (103), build.xml file (104), log4j.jar file (105), log4j.properties file (106), and the portalapp.xml file (107) is done in the directory.

The initial XML file is the credentials.xml file (101). FIG. 4 is a sample code of this credentials.xml file (101). In some embodiments, the credentials.xml file, or some other configuration file, is used to specify the repositories in the SAP EP that one wishes to synchronize with the Global Services of the SAP EP and for each repository the credentials (e.g., username and password) required to access the repository.

FIG. 6 gives the sample code for parsing credentials.xml file (101) to obtain the credentials needed to access the repository. After the credentials.xml file (101) has been successfully parsed, the credential information is stored in a list. FIG. 7 gives the sample code used in some embodiments to retrieve credentials in a list and to connect to the associated repositories.

Once connection to the repository is successful, the resource types and properties information are retrieved. In some embodiments, the repositories comprise EMC Documentum™ repositories and the Documentum™ query language (DQL) is used to retrieve resource type and property information. FIG. 9 gives the sample code used in some embodiments for extraction of the resource types and properties information. The collection "col" contains all the resource types in the repository. The collection is iterated through and an XML Node created for each type. In some embodiments, a tree representation of the XML Nodes is traversed recursively and resource type and property information is written to an XML file in the file system. An XML Document tree structure using the DOM (Document Object Model) XML parser according to the DTD of resource types in SAP EP Global Services is constructed. Similarly, properties of the particular resource type can also be extracted on running similar queries for properties.

Figure 13:
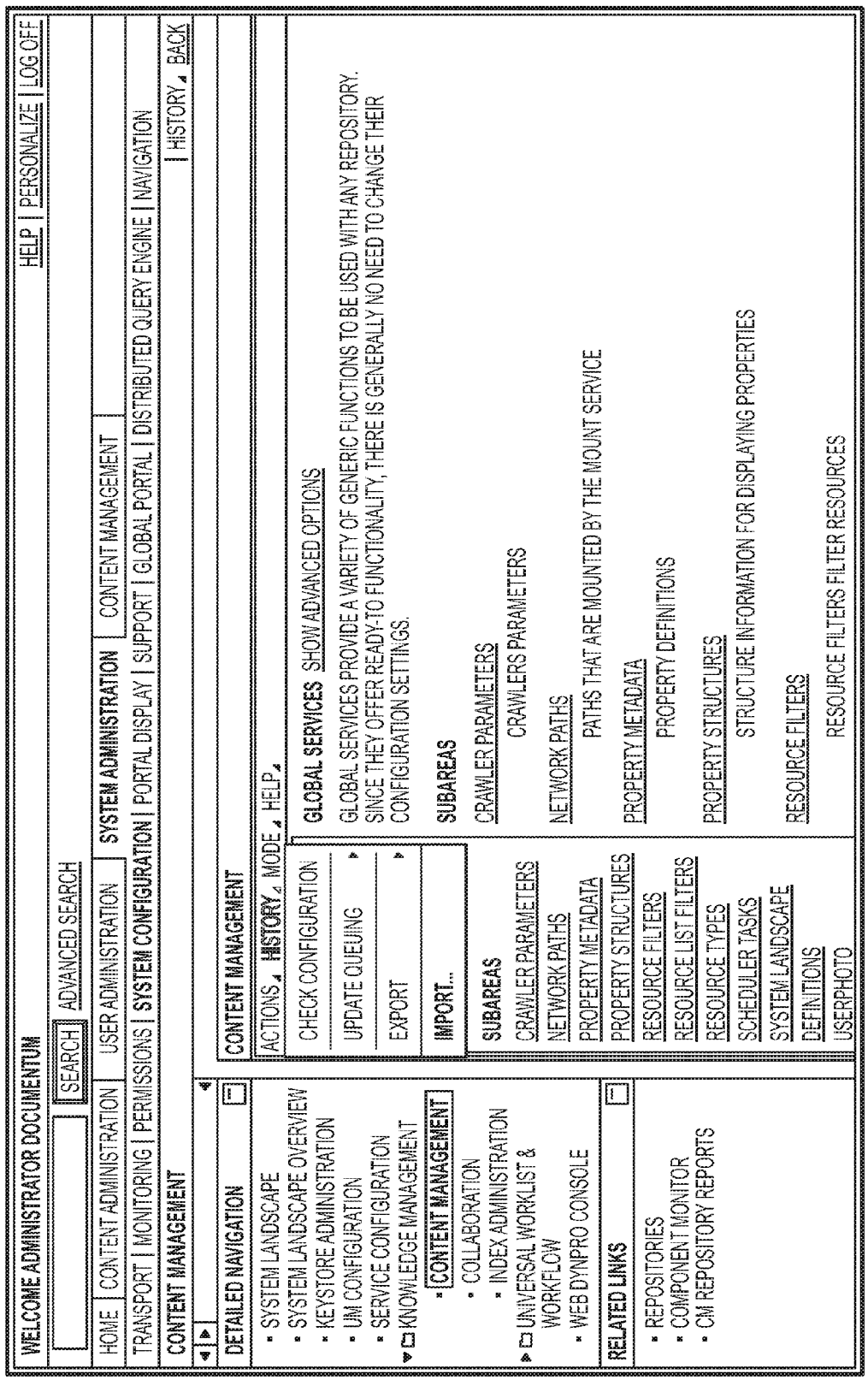
FIG. 13 is a diagram of the screen in the currently known SAP EP for choosing the importing of the ConfigArchive file.
Figure 14:
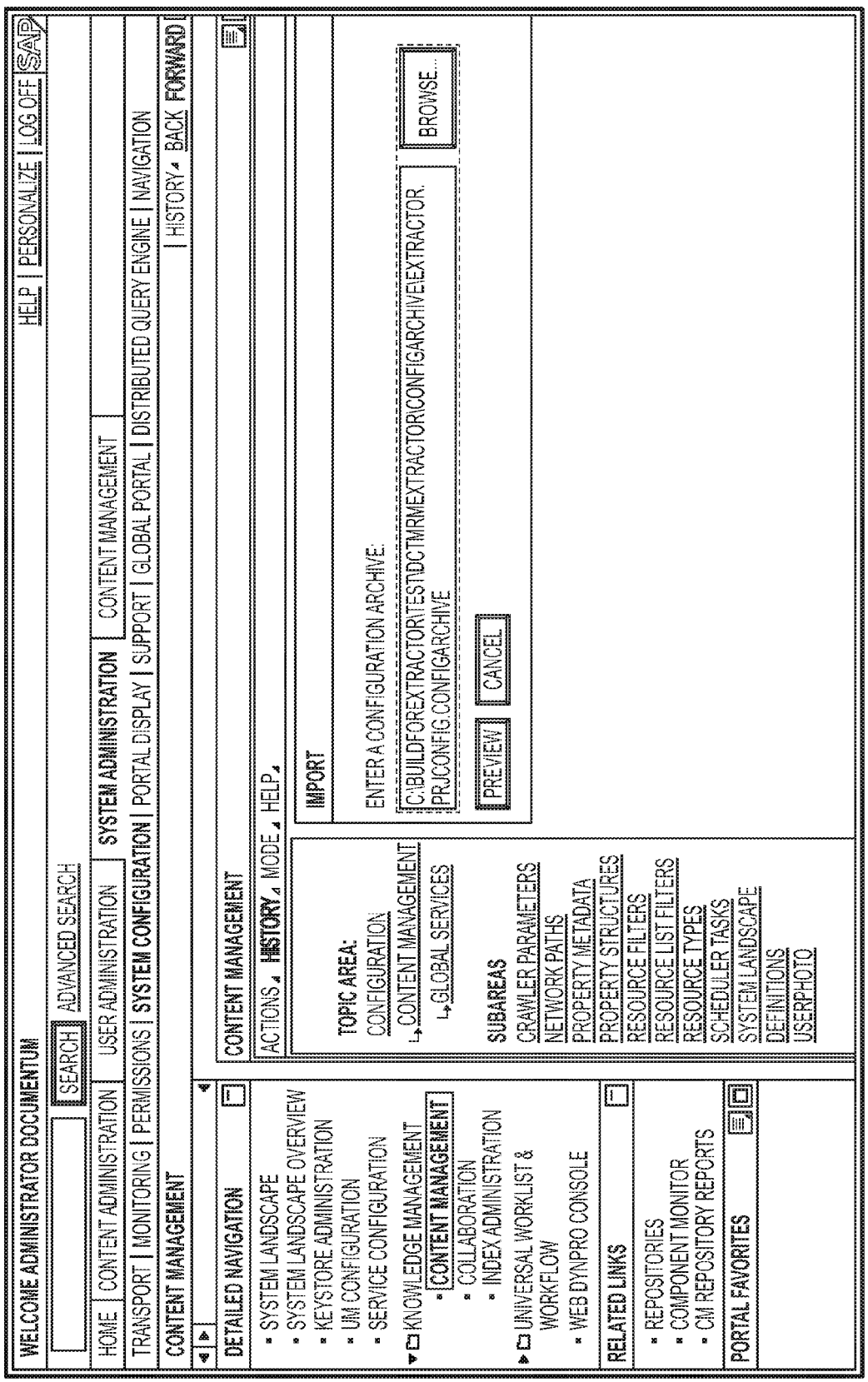
FIG. 14 is a diagram of the screen in the currently known SAP EP that shows the importing of the ConfigArchive file.
Figure 16:
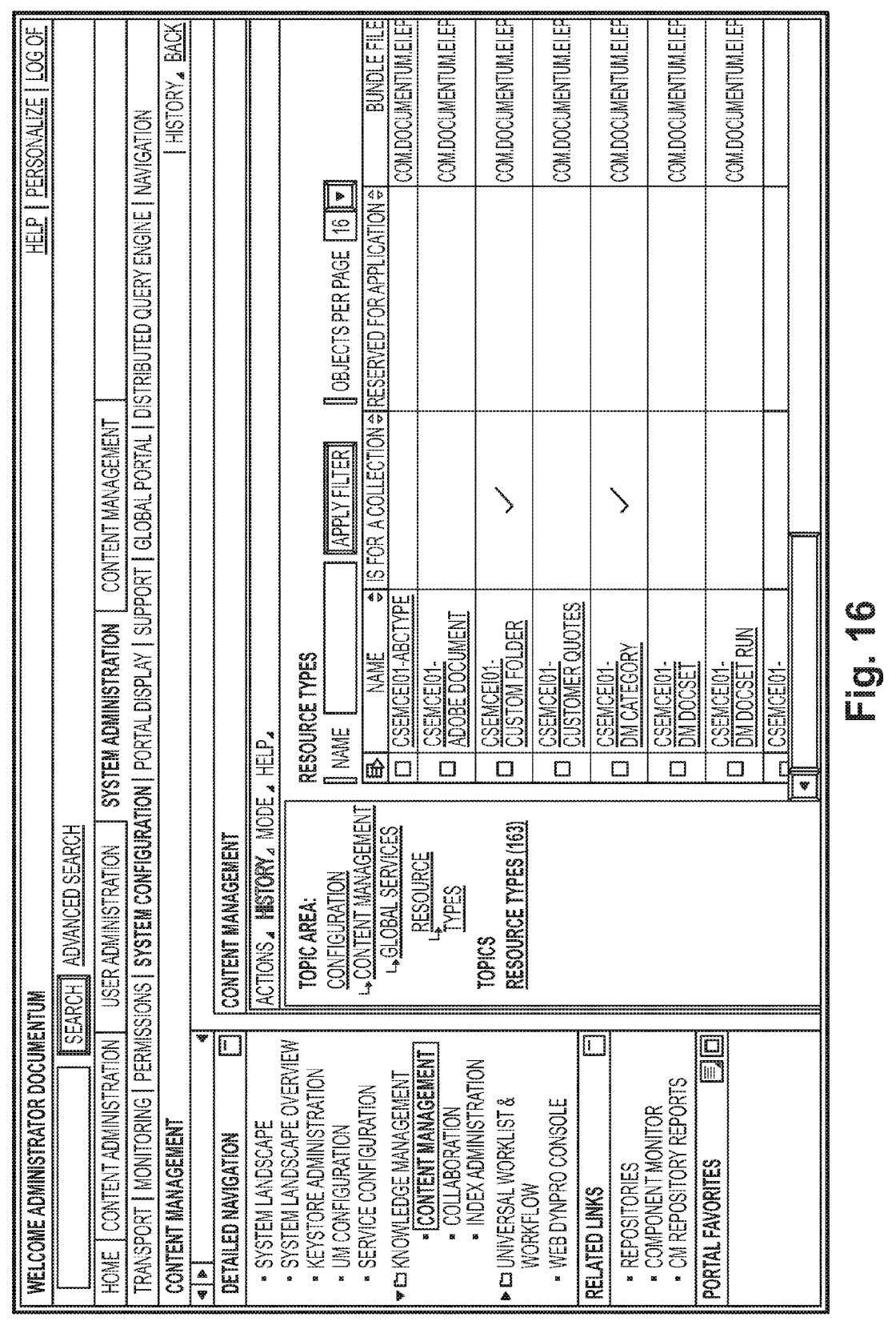

Once the extractor.prjconfig.configarchive file (108) and com.documentum.ei.eprm.ResourceBundleProject.par file (109) have been created, in some embodiments the extractor.prjconfig.configarchive file (108) is imported into the SAP EP by logging on to SAP EP as administrator, accessing the Global Services on the SAP EP by the path System Administration→System Configuration→Knowledge Management→Content Management→Global Services, selecting the "Actions" icon, clicking on the "Import" option (FIG. 13), browsing for the extractor.prjconfig.configarchive file (108), clicking on the "Preview" button (which causes all the files that need to be imported to be displayed, as shown in FIG. 14), and further clicking on the "OK" option. Once the extractor.prjconfig.configarchive file (108) is imported into the SAP EP, the resource type and properties are created in the SAP EP Global Services. FIG. 16 illustrates the creation of the resource type and properties after importing the extractor.prjconfig.configarchive file (108) into SAP EP.

Once the extractor.prjconfig.configarchive file (108) has been imported into the SAP EP, the labels for document types and the associated properties need to be displayed to the end users. To achieve this purpose, the com.documentum.ei.eprm.ResourceBundleProject.par file (109) needs to be uploaded to the SAP EP. This is done by accessing the "Administration Console" of the SAP EP by the path System Administration→Support→Portal Runtime→Administration console.

Figure 15:
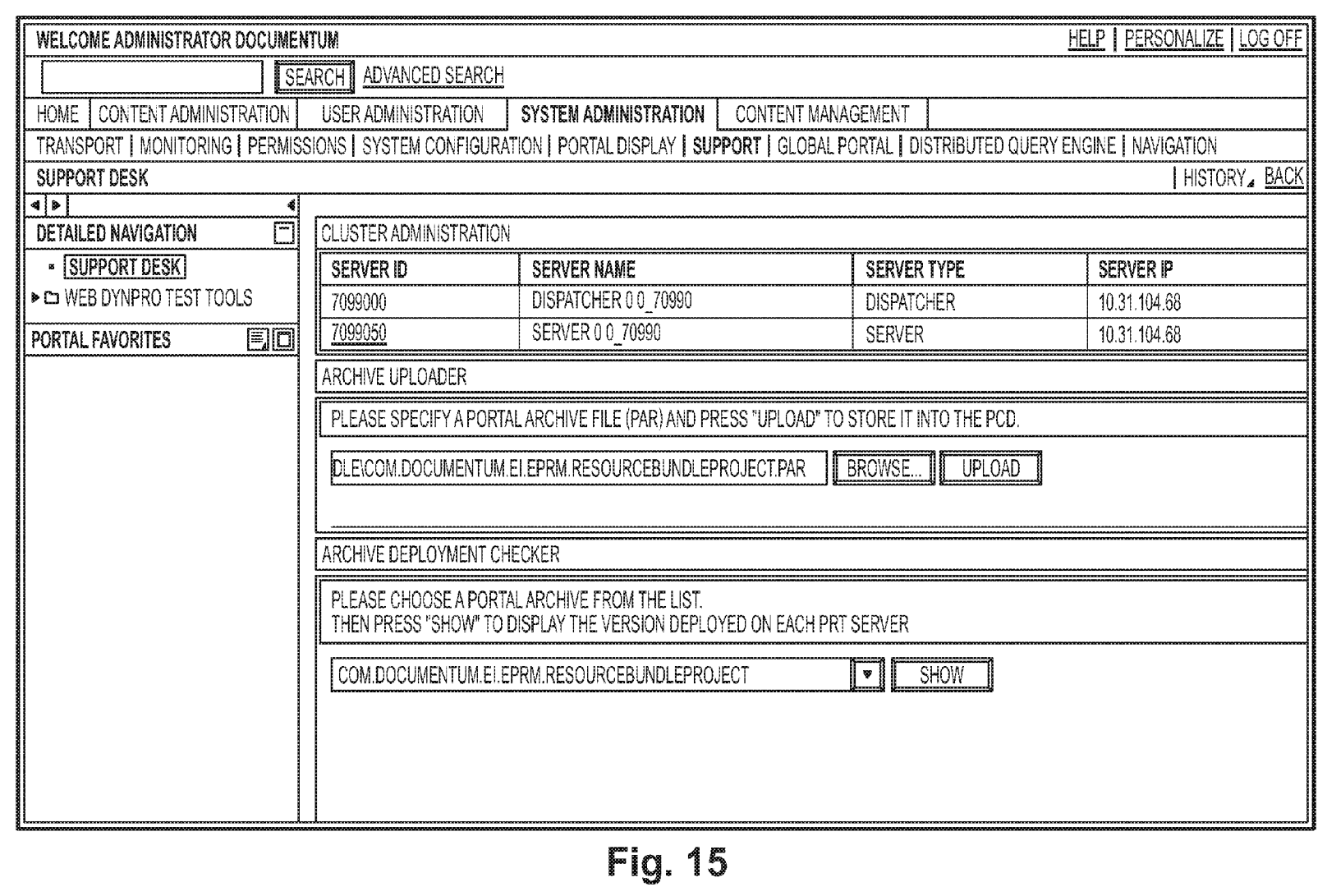

From the Administration Console, browsing and selecting the com.documentum.ei.eprm.ResourceBundleProject.par file (109) and clicking on the "Upload" button (FIG. 15), the com.documentum.ei.eprm.ResourceBundleProject.par file (109) is uploaded into the SAP EP. This synchronizes the properties of the objects in the Documentum (or other) repositories with the SAP EP Global Services.

FIG. 17 shows sample code used in some embodiments to create the extractor.prjconfig.configarchive file (108) and the com.documentum.ei.eprm.ResourceBundleProject.par file (109).

In some embodiments, all the metadata about the types and properties are stored as tables in the databases of a repository. For example all the types related data is retrieved from "dmi_dd_type_info table" and attribute related data is retrieved from dmi_dd_attr_info. To retrieve the data, IDfQuery objects are created with appropriate query strings. IDfQuery is the interface defined by DFC which has the method execute ( ). (FIG. 18)

FIG. 18 illustrates the sample code of the successful connection to the repository, constructing an XML Document tree structure using the DOM (Document Object Model) XML parser according to the DTD of resource types in SAP EP Global Services and writing to the actual XML file in the file system.

Meta data extracted from the Documentum/other repositories include the resource type names and for each resource type its associated attributes. Each attribute will have a data type like string, integer, date and time, etc. In some embodiments, this information is stored in domain_type attribute of the table dmi_dd_attr_info. Other information extracted for an attribute includes whether it is a read only property (stored in is_readonly field), whether it is indexable (is_searchable) and whether it is a mandatory attribute (is_required).

Each attribute may also contain a meaningful and localized label. For example if the attribute name is "object_name" then its label could be "Document Name" in English locale and something else in other locale. This label information is stored in label_text field. This field will be retrieved and stored in a Bundle file.

There is one bundle file for each locale. A bundle file is a properties file with key and value pair. For example key can be object_name and value can be "Document Name".

In the property XML file there is a field called "bundlekey". While creating the XML file this field is set to an appropriate key. In this example it should be object_name. Once the resource bundle is deployed using the com.documentum.ei.eprm.ResourceBundleProject.par file (109), the property will be displayed as "Document Name" instead of object_name. It might be displayed differently in another locale depending on the label_text field stored for that locale.

In an embodiment of the invention, it is possible to zip the credentials.xml file (101), RunExtractor.bat or RunExtractor.sh file (102), com.documentum.ei.eprm.extractor.jar file (103), build.xml file (104), log 4j.jar file (105), log 4j.properties file (106), and the portalapp.xml file (107) into a single zip archive file DCTMExtractor.jar. On downloading and installation of the seven files contained in the DCTMExtractor.jar file, it is possible to initiate automated business object type and attribute extraction.

While certain of the embodiments described in detail herein are executable in a Windows or a Unix environment, other embodiments may be adapted for other environments such as Linux using any XML parser adapted to run in an Linux environment. Some embodiments require ancillary Java programs such as ANT, JDK and DFC to be installed in order to be executable. However, other embodiments may be adapted to run using other Java programs and/or to use programming languages and/or platforms other than Java.

In some embodiments, semantics are mapped between the SAP Enterprise Portal and a Repository Manager that comprises the EMC Documentum Enterprise Content Management platform/software. However, in other embodiments Repository Managers other than EMC Documentum may be used. Other embodiments may also be adapted for resource and type extraction for enterprise portals other than SAP EP.

Some embodiments have been described in a Java environment. Other embodiments may also be adapted for other object oriented programming languages.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for extracting and synchronizing with an Enterprise Portal application resource types and properties of business objects located in a repository using execution of a computer code and the execution of the computer code comprising:
   parsing a credential file to determine a repository credential information required to connect to the repository;
   using the repository credential information to establish a connection to the repository;
   using the repository credential information to select business objects located in the repository;
   extracting business object type information and associated properties for each of the selected business objects; and
   generating a file of the extracted business object type information and associated properties in a format that facilitates synchronization with the Enterprise Portal application, wherein the file is configured to be uploaded to the Enterprise Portal application to result in the business object type information and associated properties being replicated at the Enterprise Portal application, wherein the business object type information and associated properties replicated at the Enterprise Portal application are configured to enable the Enterprise Portal application to access an object stored in the repository, wherein generating the file includes iterating through a plurality of resource types associated with the repository, creating a XML node for each of the plurality of resource types for a tree representation, and traversing recursively through the tree representation of XML nodes, and writing in a XML file business object type information and associated properties for each of the selected business objects based at least in part on traversing the tree representation of XML nodes.

2. A method as recited in claim 1, further comprising uploading the generated file to the enterprise portal application.

3. A method as recited in claim 1, wherein the format comprises the .configarchive file format of the SAP Enterprise Portal.

4. A method as recited in claim 1, wherein the enterprise portal application comprises the SAP Enterprise Portal.

5. A method as recited in claim 1, wherein the repository comprises a managed content repository.

6. A method as recited in claim 1, wherein the credential file comprises an XML file and an XML parser is used to parse the credential file.

7. A method as recited in claim 1, wherein determining comprises querying the repository and wherein querying the repository comprises constructing and sending to the repository a query written in a query language associated with the repository.

8. A method as recited in claim 1, wherein the business object type and property information are stored in the repository.

9. A method as recited in claim 1, further comprising generating display information for one or more of the business object types, properties, or both.

10. A method as recited in claim 9, wherein generating display information comprises creating a bundle file comprising for each of one or more business types, properties, or both a corresponding value comprising a display name for that business type or property.

11. A method as recited in claim 1, wherein the properties comprise attributes and associated attribute information.

12. A method as recited in claim 11, wherein the attribute information includes one or more of the following: a data type, whether the attribute is read only, whether the attribute is indexed, whether the attribute is searchable, and whether the attribute is required.

13. A method as recited in claim 1, wherein the business object type information and associated properties to be determined is configurable by one or more of: an object type, a language, a locale, or a selection of one or more attributes.

14. A system configured to extract and synchronize with an Enterprise Portal application resource types and properties of business objects located in repository comprising:
   a communication interface; and
   a processor coupled to the communication interface and configured to:
      parse a credential file to determine a repository credential information required to connect to the repository;
      use the communication interface with the repository credential information to establish a connection to the repository;
      use the repository credential information to select business objects located in the repository;
      extract business object type information and associated properties for each of the selected business objects; and
      generate a file of the extracted business object type information and associated properties in a format that facilitates synchronization with the Enterprise Portal application, wherein the file is configured to be uploaded to the Enterprise Portal application to result in the business object type information and associated properties being replicated at the Enterprise Portal application, wherein the business object type information and associated properties replicated at the Enterprise Portal application are configured to enable the Enterprise Portal application to access an object stored in the repository, wherein generating the file includes iterating through a plurality of resource types associated with the repository, creating a XML node for each of the plurality of resource types for a tree representation, and traversing recursively through the tree representation of XML nodes, and writing in a XML file business object type information and associated properties for each of the selected business objects based at least in part on traversing the tree representation of XML nodes; and a memory coupled to the processor and configured to provide the processor with instructions.

15. A system as recited in claim 14, wherein the Repository Framework is configured to provide to one or more applications, via the Repository Manager, access to the repository.

16. A system as recited in claim 15, wherein the Repository Framework is configured to provide to the one or more applications in a uniform manner access to two or more different types of repository.

17. A system as recited in claim 15, wherein the Repository Framework uses the representation of the business object types and associated properties to provide to the one or more applications access to the repository.

18. A system as recited in claim 14, further comprising a Repository Manager configured to manage access to the repository.

19. A system as recited in claim 14, wherein the format is described in a DTD or other schema associated with the Enterprise Portal application.

20. A system as recited in claim 14, wherein the business object type information and associated properties to be determined is configurable by one or more of: an object type, a language, a locale, or a selection of one or more attributes.

21. A computer program product for extracting and synchronizing with an Enterprise Portal application resource types and properties of business objects located in repository, the computer program product being embodied in a non-transitory computer readable storage medium and comprising computer instructions for:

parsing a credential file to determine a repository credential information required to connect to the repository;

using the repository credential information to establish a connection to the repository;

using the repository credential information to select business objects located in the repository;

extracting business object type information and associated properties for each of the selected business objects; and generating a file of the extracted business object type information and associated properties in a format that facilitates synchronization with the Enterprise Portal application, wherein the file is configured to be uploaded to the Enterprise Portal application to result in the business object type information and associated properties being replicated at the Enterprise Portal application, wherein the business object type information and associated properties replicated at the Enterprise Portal application are configured to enable the Enterprise Portal application to access an object stored in the repository, wherein generating the file includes iterating through a plurality of resource types associated with the repository, creating a XML node for each of the plurality of resource types for a tree representation, and traversing recursively through the tree representation of XML nodes, and writing in a XML file business object type information and associated properties for each of the selected business objects based at least in part on traversing the tree representation of XML nodes.

22. A method as recited in claim 1, wherein the format is described in a DTD or other schema associated with the Enterprise Portal application.

23. A computer program product as recited in claim 21, wherein the format is described in a DTD or other schema associated with the Enterprise Portal application.

24. A computer program product as recited in claim 21, wherein the business object type information and associated properties to be determined is configurable by one or more of: an object type, a language, a locale, or a selection of one or more attributes.

* * * * *